Dec. 18, 1962      D. D. VAWTER      3,068,746
MEASURING AND COMPARING DEVICE OF THE PYROMETER TYPE
Filed Jan. 29, 1960      2 Sheets-Sheet 1
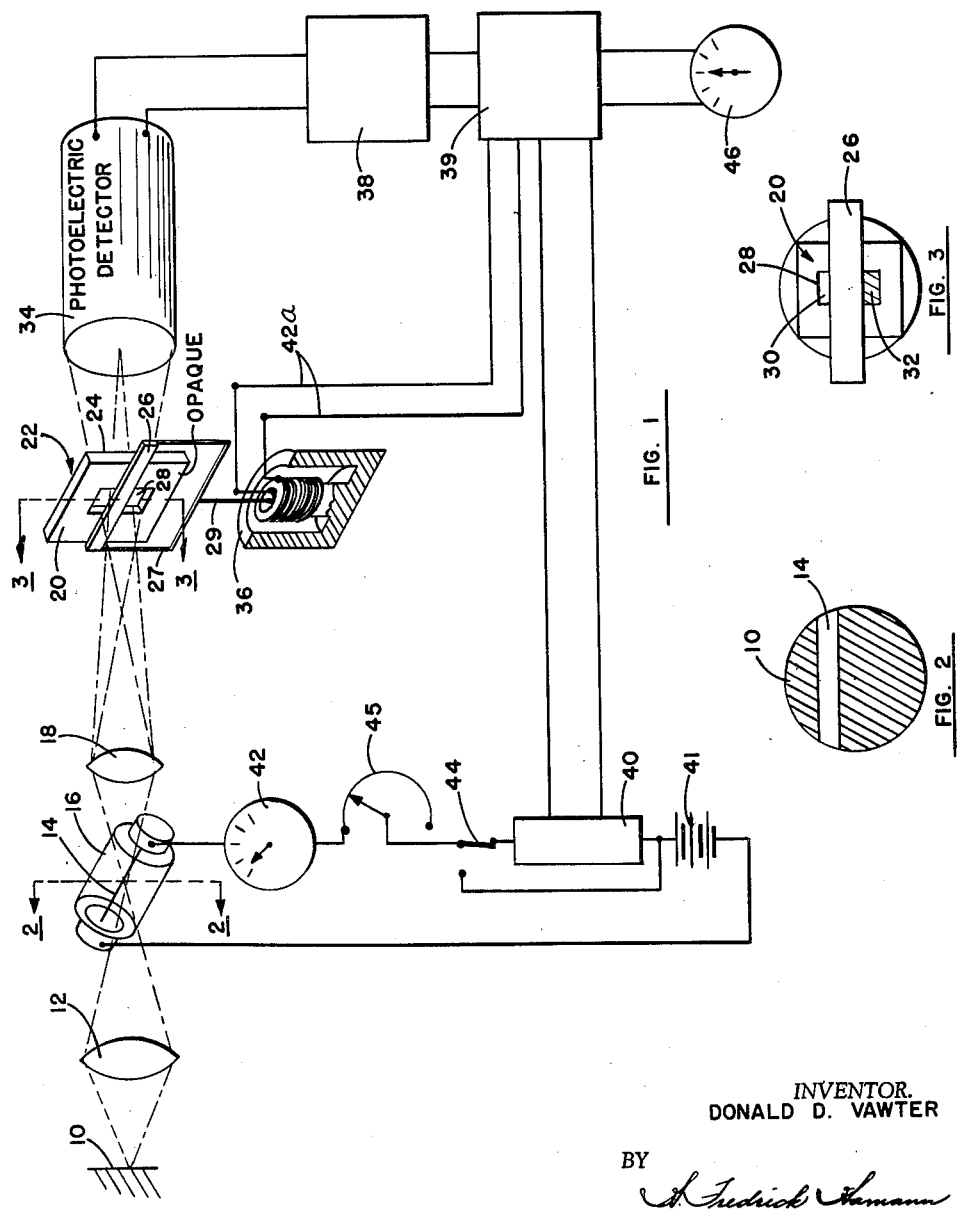
INVENTOR.
DONALD D. VAWTER
BY
ATTORNEY Dec. 18, 1962     D. D. VAWTER     3,068,746
MEASURING AND COMPARING DEVICE OF THE PYROMETER TYPE
Filed Jan. 29, 1960     2 Sheets-Sheet 2
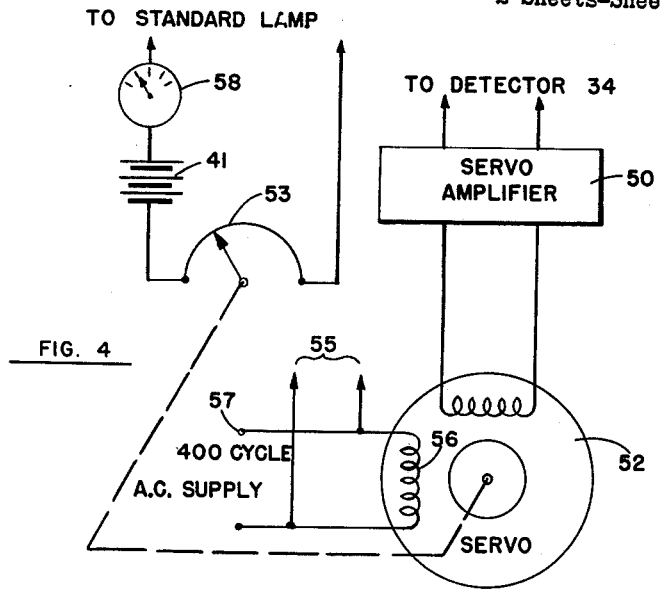
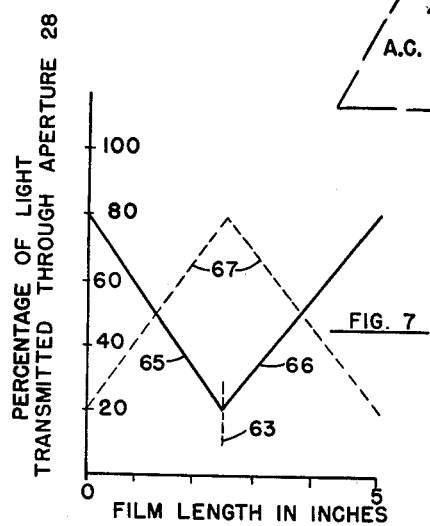
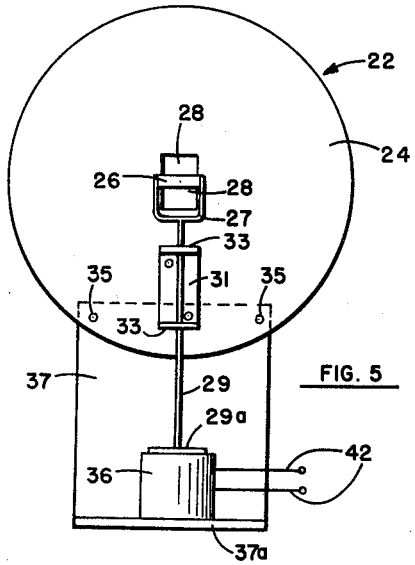
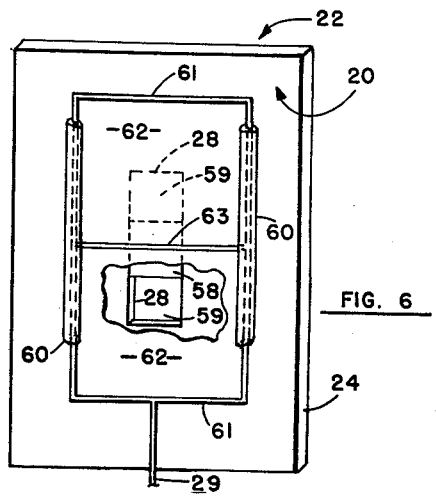
INVENTOR.
DONALD D. VAWTER
BY
ATTORNEY

United States Patent Office 3,068,746
Patented Dec. 18, 1962

3,068,746
MEASURING AND COMPARING DEVICE OF THE PYROMETER TYPE
Donald D. Vawter, Pacoima, Calif., assignor to North American Aviation, Inc.
Filed Jan. 29, 1960, Ser. No. 5,541
4 Claims. (Cl. 88—22.5)

This invention relates to apparatus for measuring or comparing radiation, e.g., light, and more particularly for comparing the relative radiation emanating from two independent sources.

Existing instruments of this type most generally employ some sort of beam-chopping system in which the detector receives radiation impulses alternately from the standard and the unknown source. The output of the detector is usually a series of pulses in which the amplitude difference between succeeding pulses is proportional to the difference in the amount of radiation emanating from the two different sources. Such instruments, when used for temperature measurement, generally employ a complex time synchronized difference amplifier system to make effective use of the detector output signal, i.e., to provide a visual display of the temperature difference or to operate a self-balancing system where the light intensity of one source is automatically adjusted to equal that of the other source.

The present invention is directed to a beam modulation and radiation intensity comparing device which is a substantial improvement over existing instruments, in that the process of making effective use of the detector output signal is substantially simplified and more accurate.

It is, therefore, the primary object of the present invention to provide a radiation modulation device which is simple, reliable, and increases the accuracy of the radiation detector.

It is a further object of my invention to provide a radiation modulator for use in total or monochromatic radiation pyrometers or other radiation comparing devices in which a direct comparison with a standard reference source is automatically made.

It is another object of the present invention to provide a radiation modulator in which the beams from an unknown and standard source are alternately varied but are never completely interrupted.

It is another object of the present invention to provide a radiation modulator by which the sum of the radiation from the standard and unknown sources is varied and in which the sum of the radiation detected is larger than the radiation value emanating from one source.

A further object of the present invention is to provide a radiation comparing system in which the radiation detector has a sinusoidal voltage output.

A further object of the present invention is to provide a radiation modulator and detector system in which the output voltage of the detector is sinusoidal and its amplitude is proportional to the difference in radiant energy from two radiating sources.

A further object of the present invention is to provide a radiation modulator and detector system in which the adjustment of one source to equal the radiation emanating from a second source is accomplished automatically in a simple, reliable manner.

These and other objects of the present invention will be more apparent from the following description and drawings, hereby made a part of the specification, in which:

FIGURE 1 is a schematic of one system utilizing the devices of the present invention, FIGURE 2 is a view of the images along line 2—2 of FIGURE 1, FIGURE 3 is a view of the images along line 3—3 of FIGURE 1, FIGURE 4 is an alternate control system for the device of FIGURE 1, FIGURE 5 is a view of the modulator assembly of the preferred embodiment, and FIGURE 6 is a view of a modified modulator assembly.

FIGURE 7 is a graph showing the light transmission characteristics of the modulator assembly of FIGURE 6.

The particular embodiment shown in FIGURE 1, which is one example of the system of the present invention, is a radiation pyrometer which comprises, in general, a telescope assembly for the purpose of intercepting radiant energy from a target source, a filament type standard radiation source, a detector with which to compare the intensities of radiation emanating from two sources, a moving vane- radiation modulator assembly and a means to provide either instantaneous visual indications of temperature or automatic recording operation.

Referring now to FIGURE 1, more specifically, a portion of the radiation originating from heat source 10 of unknown temperature is intercepted by the objective lens 12 and brought to focus on a plane containing the filament 14 of the standard source 16. The composite of the tungsten filament 14 and the image of the source 10 has the general appearance of that shown in FIGURE 2. This forms the object for the secondary lens 18 which produces a highly magnified image of the tungsten filament 14 and the target source 10 on the front surface 20 of the modulator assembly, indicated generally at 22. The assembly 22 comprises the aperture plate 24 and the movable vane 26. The aperture plate 24 is of opaque material and contains a small rectangular primary aperture 28 over which the light weight movable vane 26 is approximately centered, resulting in two smaller secondary apertures 30 and 32 (see FIGURE 3) of approximately equal area. The modulator assembly 22 is positioned such that the magnified image of the tungsten filament 14 covers completely the upper aperture 30, while the image of the target source 10 similarly covers the lower aperture 32, as depicted in FIGURE 3 which represents the modulator assembly 22 as seen from the side opposite the sources of radiation. Consequently, the radiation arriving at the detector 34 is the sum of the radiation from the standard lamp 16, passing through the upper aperture 30, and the radiation from the target source 10, passing through the lower aperture 32. When the instrument is operating, the vane 26 is caused to move or vibrate at a definite frequency by means of the moving coil electromagnetic driver 36, which is excited by a sinusoidal alternating current as at 42a. The manner of movement or vibration is such as to cause an alternate increase and decrease in the area of each aperture, the decrease in area for one aperture being equal to the increase in area of the other aperture, and this change in areas being simultaneous. Since the electromagnetic driver 36 is a linear transducer, the vibration imparted to the vane is essentially sinusoidal. The resulting sinusoidal variation in area proportionally varies the amount of radiant energy passing through each aperture 30 and 32. The amplitude of vane vibration should not be large enough to completely block the entire area of either aperture; to do so would distort the sinusoidal change in transmitted radiation. The frequency of vibration is not critical except that it is preferably high enough to allow the advantageous use of stable A.C. coupled amplifiers in the remaining circuitry which is described hereinafter.

Since the increase in the area of one aperture is exactly equal to the decrease in the area of the other aperture, it follows that the detector 34 experiences no change in total area, and consequently in incident energy, when the apertures are subjected to radiation of equal intensity. Under these conditions, the A.C. output of the detector 34 will be zero. If the two sources 10 and 14 are unequal in emanated radiation, a sinusoidal A.C. voltage appears at the output of the detector 34. The amplitude of this voltage is proportional to the difference in radiant energy of the two radiating sources and has either a zero or 180 degree phase relationship with the exciting voltage of the electromagnetic driver 36, depending upon which source is higher in temperature.

This error signal is a basic type used extensively in the field of electronic regulation and control and, as such, is directly applicable to a number of well known electronic components. The circuit arrangement shown in FIGURE 1 shows one circuit utilizing well known components by which automatic operation can be achieved. This system comprises a high gain A.C. amplifier 38, a phase sensitive rectifier 39, and a vacuum tube or transistor series current controller 40. The amplifier 38 serves to boost the feeble output voltage of the detector 34 prior to its application to the phase sensitive rectifier 39. The output of the latter is a D.C. voltage whose magnitude and polarity is related respectively to the magnitude and phase of its A.C. input voltage. This action is made possible by the fact that the phase reference signal of the phase sensitive rectifier 39 has a constant phase relationship to the exciting voltage of the electromagnetic driver 36. In the case of automatic operation, this D.C. signal is fed to the current controller 40 which serves to adjust the current (and hence the intensity of radiation) of the standard lamp filament 14 from source 41 until a null condition is reached (output of phase sensitive rectifier is effectively zero). The temperature is then determined from the temperature calibrated ammeter 42. For manual operation, the current controller 40 is by-passed by means of switch 44. Rheostat 45 is then adjusted manually until a temperature balance is achieved, as observed on the zero center null indicator 46.

An alternative self-balancing system, which may also be utilized, is shown in FIGURE 4. It utilizes a servo-amplifier 50, a two-phase servo-motor 52, and a motor-driven variable resistor 53, the system having increased stability since the error signal appearing at the detector output is more directly converted to corrective action (adjustment of standard lamp 16 current). The precision of this system depends mainly upon the resolution of the variable resistor 53 which may be of refined design such as a slidewire with integrated range steps.

As seen in FIGURE 4, the exciting voltage 55 of the electromagnetic driver 36 and the voltage applied to the reference winding 56 of the two-phase servo-motor 52 have a common source 57 and, hence, a constant phase relationship. Therefore, the direction of servo-motor rotation is determined by the phase of the voltage appearing at the detector output. The direction of rotation is always such as to equalize the radiation intensity of the standard source 16 and the target source 10. As before, temperature is determined through observation of the temperature calibrated meter 58. In either system, the standard lamp current may be used to operate a standard recorder.

FIGURE 5 shows the preferred embodiment of the radiation modulator assembly 22 of the present invention and consists of a plate 24 defining a plane having an aperture 28 and movable vane 26. The vane 26 is supported by a wire yoke 27 which is connected to a rod 29. The rod 29 is held in position by guide plate 31 having guides 33 at both ends. The guides 33 maintain the vane 26 against the surface of plate 24 so that the vane 26 is in the plane mentioned above. Attached to and bolted, as by bolts 35, to the plate 24 is a coil supporting plate 37 having a bottom portion 37a which supports the electromagnetic driver 36. The driver 36 in the preferred embodiment is a loud speaker core and is preferred because it is a linear transducer and the displacement of the rod 29 connected to a vibrating plate 29a is directly proportional to the voltage applied at 42a. Other means for moving the vane 26 may also be utilized, e.g., a mechanical movement such as a motor driving an eccentric cam where the rod 29 follows the cam surface.

The aperture 28 is divided into two areas by the vane 26. The total areas do not necessarily have to be equal, since the detector circuits described above are dependent upon variation in the radiation received and not upon the absolute magnitude from the sources. However, the areas through which the vane interrupts radiation must be equal. This significantly simplifies the use of the present invention since time-consuming alignments and checking of illuminated aperture areas are not required. Further, the shape of the aperture is not critical; however, in order to avoid a spurious variation in the output of the detector the sides of the portion of the aperture across which the vane moves should be parallel.

FIGURE 6 shows an alternate modulator which can be used in the combination of FIGURE 1, for example. In this embodiment the modulator assembly 22 consists of an opaque plate 24 defining a plane having an aperture 28 divided into two, preferably equal, areas by opaque insert 58. The two secondary apertures 59 formed thereby are spaced apart. The plate 24 is provided with guides 60 which hold a frame 61 against the plane 20 of the plate 25. The frame 61 is connected to rod 29 which is moved longitudinally by an electromagnetic driver 36 as in the preferred embodiment. Within the frame 61 is a film or similar material 62 which has the light transmission characteristic shown in FIGURE 7, e.g., neutral density film wedges sold under the trademark "Kodak." The film 62 is actually in two pieces separated by a cross frame 63. The cross frame 63 is moved between the two apertures 59 by rod 29 and never passes over any portion of either aperture 59. The lights from two independent sources are each positioned on one of the apertures 59 as explained above. It is apparent from FIG. 7 that the light transmission characteristics of each film 62 are identical and linear, and that they are placed in the frame 61 so that the portion through which the greatest percentage of light is transmitted is adjacent the center or cross frame 63. Thus, line 65 represents the characteristics of the piece of film 62 across the upper aperture 59, and line 66 represents the characteristics of the piece of film across the lower aperture 59. The space between apertures 59 may be selected as desired provided the movement of cross frame 63 is restricted to the area of insert 58 between apertures 59. The distance between apertures 59 remains constant and is a fixed distance along the lines 65 and 66. Thus, by movement of the frame 61, the light transmitted through the upper aperture 59 moves downward along line 65; the light transmitted through the lower aperture 59 will move upward along line 66. If the light sources illuminating the apertures 29 are of equal intensity, the total radiation incident upon the detector will remain constant. It is also apparent that lines 65 and 66 of FIGURE 7 could be oriented as shown by the dotted lines 67, i.e., that the low radiation transmission portions of the film pieces 62 be placed adjacent adjacent the cross frame 63. Further, the range of the percentage of transmission for each piece of film is not critical, provided the variation in light falling upon the detector is sufficiently large to detect for the particular characteristics of the detector.

This embodiment does not have some of the advantages of the preferred embodiment since it is more intricate and utilizes material (film) which is more susceptible to environmental changes.

The radiation modulator of the present invention may also be used to compare sources of radiation other than electromagnetic. For example, sources having columnated particle beams directed toward a crystal detector could be modulated by the present invention. One of the sources could be a standard with a variable aperture controlled by the detector as described above. Other modifications and variations of the present invention will be apparent to those skilled in the art and, therefore, the present invention is not limited to the above described specific embodiments but only by the following claims.

What is claimed is:

1. A pyrometer for determining the temperature of an object comprising in combination optical means adapted to be directed toward said object; means for generating a comparison light; means for adjusting the intensity of said comparison light, said object and comparison light being directed toward a light detecting means; an opaque plate between said optical means and said detecting means, said plate having a primary aperture therein; movable light absorbing means for separating said primary aperture into two secondary apertures; focusing means for directing the light from said object light on one of said secondary apertures and for directing the light of said comparsion light on the other of said apertures, said detecting means including a photocell for detecting light passing through both said secondary apertures, the image of said object light and said comparison light as formed by said focusing means, being positioned at a predetermined distance from said detecting means; means for alternately increasing the light passing through one of said secondary apertures while simultaneously partially interrupting the light passing through the other of said secondary apertures, said last-named means including said light absorbing means supported adjacent said plate for movement in a predetermined plane and in maintained parallel alignment with said plate; means responsive to variations in light detected by said photocell for energizing said adjusting means; and indicator means responsive to said adjusting means for indicating the temperature of said comparison light.

2. A pyrometer for determining the temperature of an object comprising in combination optical means adapted to be directed toward said object; means for generating a comparison light; means for adjusting the intensity of said comparison light, said object and comparison light being directed toward a light detecting means; an opaque plate between said optical means and said detecting means, said plate having a primary aperture therein; a movable vane for separating said primary aperture into two secondary apertures; focusing means for directing the light from said object light on one of said secondary apertures and for directing the light of said comparison light on the other of said apertures, said detecting means including a photocell for detecting light passing through both said secondary apertures, the image of said object light and said comparison light as focused by said focusing means being positioned on a common plane located adjacent said plate; means for alternately increasing the light passing through one of said secondary apertures while simultaneously partially interrupting the light passing through the other of said secondary apertures, said last-named means including said movable vane supported adjacent said plate for movement in a predetermined and maintained parallel alignment with said plate; means responsive to variations in light detected by said photocell for energizing said adjusting means; and indicator means responsive to said adjusting means for indicating the temperature of said comparison light.

3. A pyrometer for determining the termperature of an object comprising in combination means for generating a comparison light; means for adjusting the intensity of said comparison light; optical means for focusing an image of said object and said comparison light in a common plane; an opaque plate located adjacent said common plane, said plate having a primary aperture therein; a movable vane for separating said primary aperture into two secondary apertures, said light from said object being positioned on one of said secondary apertures, said light from said comparison light being positioned on the other of said secondary apertures; a photocell positioned adjacent said seconary aperture for detecting light passing through said secondary apertures; means for alternately increasing and decreasing the light passing through one of said secondary apertures while simultaneously partially interrupting the light passing through said other aperture, said last-named means including said movable vane; a rod connected to and supporting said vane, said means for alternately increasing and decreasing said light including coil means adapted to oscillate said rod and vane in a predetermined plane; means supported on said plate for maintaining said predetermined plane of said movable vane in parallel relationship with said plate; means responsive to variations in light detected by said photocell for energizing said adjusting means; and indicator means responsive to said adjusting means for indicating the temperature of said comparison light.

4. The pyrometer of claim 3 wherein said comparison light includes a filament and said optical means includes a first element for focusing an image of said object on said filament and wherein said means for maintaining said predetermined plane includes a guide element slidably engaging said rod.

References Cited in the file of this patent

UNITED STATES PATENTS

| | | |
|---|---|---|
| 1,561,583 | Bash | Nov. 17, 1925 |
| 1,970,103 | Runaldue | Aug. 14, 1934 |
| 2,151,474 | Johnson | Mar. 21, 1939 |
| 2,219,775 | Harrison | Oct. 29, 1940 |
| 2,721,259 | Krasno | Oct. 18, 1953 |
| 2,927,502 | Watrous | Mar. 8, 1960 |

FOREIGN PATENTS

| | | |
|---|---|---|
| 516,177 | Belgium | Dec. 31, 1952 |